United States Patent
Prosser (10) Patent No.: US 10,919,640 B2
(45) Date of Patent: Feb. 16, 2021

(54) CONVERSION BETWEEN CALIBRATED AIRSPEED AND TRUE AIRSPEED IN TRAJECTORY MODELING

(71) Applicant: Gulfstream Aerospace Corporation, Savannah, GA (US)

(72) Inventor: Kevin Prosser, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 283 days.

(21) Appl. No.: 16/191,103

(22) Filed: Nov. 14, 2018

(65) Prior Publication Data
US 2019/0146001 A1     May 16, 2019

Related U.S. Application Data (60) Provisional application No. 62/586,022, filed on Nov. 14, 2017.

(51) Int. Cl.
*G01P 5/16* (2006.01)
*B64D 43/02* (2006.01)
(Continued)

(52) U.S. Cl.
CPC .............. *B64D 43/02* (2013.01); *B64D 31/00* (2013.01); *G01P 5/16* (2013.01); *G01W 1/00* (2013.01);
(Continued)

(58) Field of Classification Search
CPC .......... G01P 13/025; G01P 5/165; G01P 5/14; G01P 5/16; G01P 13/02; G01P 5/00;
(Continued)

(56) References Cited

U.S. PATENT DOCUMENTS 5,056,027 A    10/1991  Kahler
5,751,609 A *  5/1998   Schaefer, Jr. ............. G01P 5/00
                                                     700/38
(Continued)

FOREIGN PATENT DOCUMENTS

WO       2016191320 A1    12/2016

OTHER PUBLICATIONS

International Bureau of WIPO, International Search Report and Written Opinion for Application No. PCT/US2018/061075, dated Feb. 7, 2019.

(Continued)

*Primary Examiner* — Andre J Allen
(74) *Attorney, Agent, or Firm* — LKGlobal | Lorenz & Kopf, LLP (57) ABSTRACT

Systems, methods, aircraft, non-transitory media, and memories are provided. An avionics system for an aircraft includes a storage device and one or more data processors. The storage device stores instructions for converting between airspeed types and the one or more data processors is configured to execute the instructions to: generate a calibrated airspeed of the aircraft; convert the calibrated airspeed to an actual true airspeed of the aircraft; determine an initial approximate relationship between the calibrated airspeed and a computed true airspeed as a function of a pressure altitude of the aircraft; generate an adjusted approximate relationship based on the actual true airspeed and the initial approximate relationship at a chosen pressure altitude; and estimate a future airspeed of the aircraft based on the adjusted approximate relationship and a future altitude.

21 Claims, 4 Drawing Sheets

(51) Int. Cl.
*B64D 31/00* (2006.01)
*G07C 5/02* (2006.01)
*G07C 5/08* (2006.01)
*G06F 30/20* (2020.01)
*G01W 1/00* (2006.01)
*G06N 5/04* (2006.01)
*G08G 5/00* (2006.01)
*G06F 111/10* (2020.01)

(52) U.S. Cl.
CPC ............. *G06F 30/20* (2020.01); *G06N 5/046* (2013.01); *G07C 5/02* (2013.01); *G07C 5/08* (2013.01); *G08G 5/0034* (2013.01); *G08G 5/0039* (2013.01); *G08G 5/0091* (2013.01); *G01W 2001/003* (2013.01); *G06F 2111/10* (2020.01)

(58) Field of Classification Search
CPC .. G01P 5/02; G01P 21/025; G01P 5/12; G01P 5/26; G01P 5/005; G01P 5/175; G01P 5/18; G01P 5/24; G01P 13/045; G01P 15/036; G01P 1/02; G01P 21/00; G01P 3/62; G01P 5/07; G01P 5/08; G01P 5/245
USPC ..................................................... 73/170.02
See application file for complete search history.

(56) References Cited

U.S. PATENT DOCUMENTS

| | | | | |
|---|---|---|---|---|
| 5,874,673 | A * | 2/1999 | Greene | G01P 13/025 73/170.02 |
| 5,946,642 | A * | 8/1999 | Hedrick | G01L 9/06 702/138 |
| 10,006,928 | B1 * | 6/2018 | Hagerott | G01P 5/16 |
| 2006/0089760 | A1 | 4/2006 | Love et al. | |
| 2009/0093919 | A1 * | 4/2009 | Certain | G01P 3/62 701/7 |
| 2009/0132104 | A1 | 5/2009 | Rupnik et al. | |
| 2010/0314487 | A1 | 12/2010 | Boelitz et al. | |
| 2011/0251740 | A1 | 10/2011 | Gomez Ledesma et al. | |
| 2012/0158220 | A1 | 6/2012 | Accardo et al. | |
| 2013/0026299 | A1 | 1/2013 | Constans et al. | |
| 2014/0330455 | A1 | 11/2014 | McIntyre et al. | |
| 2015/0094976 | A1 * | 4/2015 | Cooper | G01L 27/002 702/98 |
| 2015/0364046 | A1 | 12/2015 | Lissajoux et al. | |
| 2016/0004255 | A1 | 1/2016 | Moxon | |
| 2016/0023776 | A1 * | 1/2016 | Ganguli | G01P 21/025 701/14 |
| 2016/0026190 | A1 * | 1/2016 | Kowalski | G01P 5/18 701/7 |
| 2016/0063867 | A1 | 3/2016 | Zammit et al. | |
| 2016/0161524 | A1 * | 6/2016 | Delporte | G01P 5/16 702/96 |
| 2016/0178364 | A1 | 6/2016 | Walter | |
| 2016/0376003 | A1 * | 12/2016 | Feldman | B64C 13/44 703/2 |
| 2018/0356437 | A1 * | 12/2018 | Luo | G01P 21/025 |
| 2018/0356439 | A1 * | 12/2018 | Luo | B64D 45/0005 |
| 2019/0146001 | A1 * | 5/2019 | Prosser | G07C 5/02 73/182 |
| 2019/0185178 | A1 * | 6/2019 | Zhou | G01C 23/005 |

OTHER PUBLICATIONS

International Bureau of WIPO, International Search Report and Written Opinion for Application No. PCT/US2018/061081, dated Feb. 15, 2019.

International Bureau of WIPO, International Search Report and Written Opinion for Application No. PCT/US2018/061090, dated Jan. 24, 2019.

* cited by examiner

CONVERSION BETWEEN CALIBRATED AIRSPEED AND TRUE AIRSPEED IN TRAJECTORY MODELING

CROSS-REFERENCE TO RELATED APPLICATIONS

This application claims the benefit of U.S. Provisional Application No. 62/586,022 filed on Nov. 14, 2017. The disclosure of the above application is incorporated herein by reference.

TECHNICAL FIELD

The present disclosure generally relates to aircraft flight modeling with airspeed computation, and more particularly relates to conversion between calibrated airspeed and true airspeed along a potential trajectory of the aircraft.

BACKGROUND

An airspeed of an aircraft may be described using several different airspeed types. An Indicated Airspeed (IAS) indicates a dynamic pressure as a pressure difference in an aircraft pitot-static system. The indicated airspeed, however, does not describe the actual speed of the aircraft through the air. A Calibrated Airspeed (CAS) corrects the IAS for known instrument and position errors for the specific aircraft type and model. The CAS, however, does not indicate the speed of the aircraft relative to the airmass in which the aircraft is flying. A True Airspeed (TAS) indicates the speed of the aircraft relative to the airmass in which the aircraft is flying by adjusting for air density changes due to altitude or air temperature differences. Each of the IAS, CAS, and TAS is used for some aspect of flight planning and/or flight performance evaluation. Therefore, calculation between the airspeeds is desirable.

Computation of True Airspeed (TAS) and/or Calibrated Airspeed (CAS) can be difficult because the TAS/CAS relationship is dependent on the atmospheric conditions at the time. A "Standard Atmosphere" is typically used when trying to predict what the future relationship between TAS and CAS will be. A Standard Day (STD) is when the actual conditions match the standard conditions. The full TAS to CAS equation is computationally intensive. Further, the equations themselves rely on the atmosphere having a standard sea level temperature and standard lapse rate. On a standard day, the full equation will be exact and will result in zero error. On a non-standard day, however, even those computationally intensive equations may have large errors. For example, errors in excess of 27 knots may exist using the full equations for calculating TAS from 250 Knots CAS on a non-standard day that is 20 degrees Celsius hotter than standard. Similar errors may exist on colder than normal days and on days where the sea level temp is "standard" but the temperature lapse rate varies from standard.

Pilots typically use a rule of thumb (ROT) to compute TAS without the need to use the full equation. To compute TAS from CAS using the ROT, the pilot takes the CAS and adds 2% per thousand feet in altitude. For example, to compute TAS for 250 knots CAS at 10,000 feet, the pilot adds 20% (2%*10,000/1000) to the CAS to estimate the TAS is 250 plus 50, or 300 knots TAS. While the ROT method is simple, it produces very large errors at high altitude. Errors as high as 95 knots exist at high altitude and errors grow even larger on a non-standard day. On a 20 degree Celsius hot day for example, the error can reach 123 knots.

SUMMARY

Systems, methods, aircraft, non-transitory media, and memories are provided. In a first example, an avionics system for an aircraft includes a storage device and one or more data processors. The storage device stores instructions for converting between airspeed types and the one or more data processors is configured to execute the instructions to: generate a calibrated airspeed of the aircraft; convert the calibrated airspeed to an actual true airspeed of the aircraft; determine an initial approximate relationship between the calibrated airspeed and a computed true airspeed as a function of a pressure altitude of the aircraft; generate an adjusted approximate relationship based on the actual true airspeed and the initial approximate relationship at a chosen pressure altitude; and estimate a future airspeed of the aircraft based on the adjusted approximate relationship and a future altitude.

In a second example, a method for converting between airspeed types of an aircraft includes generating, by one or more data processors, a calibrated airspeed of the aircraft. The method further includes converting, by one or more data processors, the calibrated airspeed to an actual true airspeed of the aircraft. The method further yet includes determining, by one or more data processors, an initial approximate relationship between the calibrated airspeed and a computed true airspeed as a function of a pressure altitude of the aircraft. The method yet further includes generating, by one or more data processors, an adjusted approximate relationship based on the actual true airspeed and the initial approximate relationship at a chosen pressure altitude. The method yet further includes estimating, by one or more data processors, a future airspeed of the aircraft based on the adjusted approximate relationship and a future altitude.

In a third example, a non-transitory computer readable storage medium has instructions that when executed cause one or more data processors to: generate a calibrated airspeed of the aircraft; convert the calibrated airspeed to an actual true airspeed of the aircraft; determine an initial approximate relationship between the calibrated airspeed and a computed true airspeed as a function of a pressure altitude of the aircraft; generate an adjusted approximate relationship based on the actual true airspeed and the initial approximate relationship at a chosen pressure altitude; and estimate a future airspeed of the aircraft based on the adjusted approximate relationship and a future altitude.

In a fourth example, an aircraft includes a pitot tube, a static port, and an avionics system. The avionics system includes a storage device for storing instructions for converting between airspeed types and one or more data processors configured to execute the instructions to: receive sensor signals from the pitot tube and the static port; generate a calibrated airspeed of the aircraft based on the sensor signals; convert the calibrated airspeed to an actual true airspeed of the aircraft; determine an initial approximate relationship between the calibrated airspeed and a computed true airspeed as a function of a pressure altitude of the aircraft; generate an adjusted approximate relationship based on the actual true airspeed and the initial approximate relationship at a chosen pressure altitude; and estimate a future airspeed of the aircraft based on the adjusted approximate relationship and a future altitude.

In a fifth example, a memory is configured for storing data for access by an avionics system of an aircraft. The memory includes an initial approximate relationship data structure that stores first data for determining an initial approximate relationship between a calibrated airspeed a computed true airspeed as a function of a pressure altitude of the aircraft. The memory further includes an adjusted approximate relationship data structure that stores second data for determining an adjustment to the initial approximate relationship based on an actual true airspeed at a chosen pressure altitude. The memory further still includes a future airspeed data structure that stores third data for estimating a future airspeed of the aircraft based on the adjustment and a future altitude.

BRIEF DESCRIPTION OF THE DRAWINGS

Advantages of the systems and method described herein will be readily appreciated, as the same becomes better understood by reference to the following detailed description when considered in connection with the accompanying drawings wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., memory, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Various embodiments disclosed herein describe methods and systems for computation of airspeeds. Specifically, the methods and systems are less computationally intensive and/or are more accurate than the conventional methods described above for converting Calibrated Airspeed and True Airspeed. Because the methods are less computationally intensive, more computations may be performed on the same computing hardware onboard an aircraft or the computational capacity may be reduced to make the aircraft lighter and less expensive. In some examples, the methods and systems are utilized to convert between Calibrated Airspeed (CAS) and True Airspeed (TAS) when predicting the potential recovery trajectories of U.S. patent application Ser. No. 15/470,776, filed Mar. 27, 2017, which is incorporated herein by reference.

Figure 1:
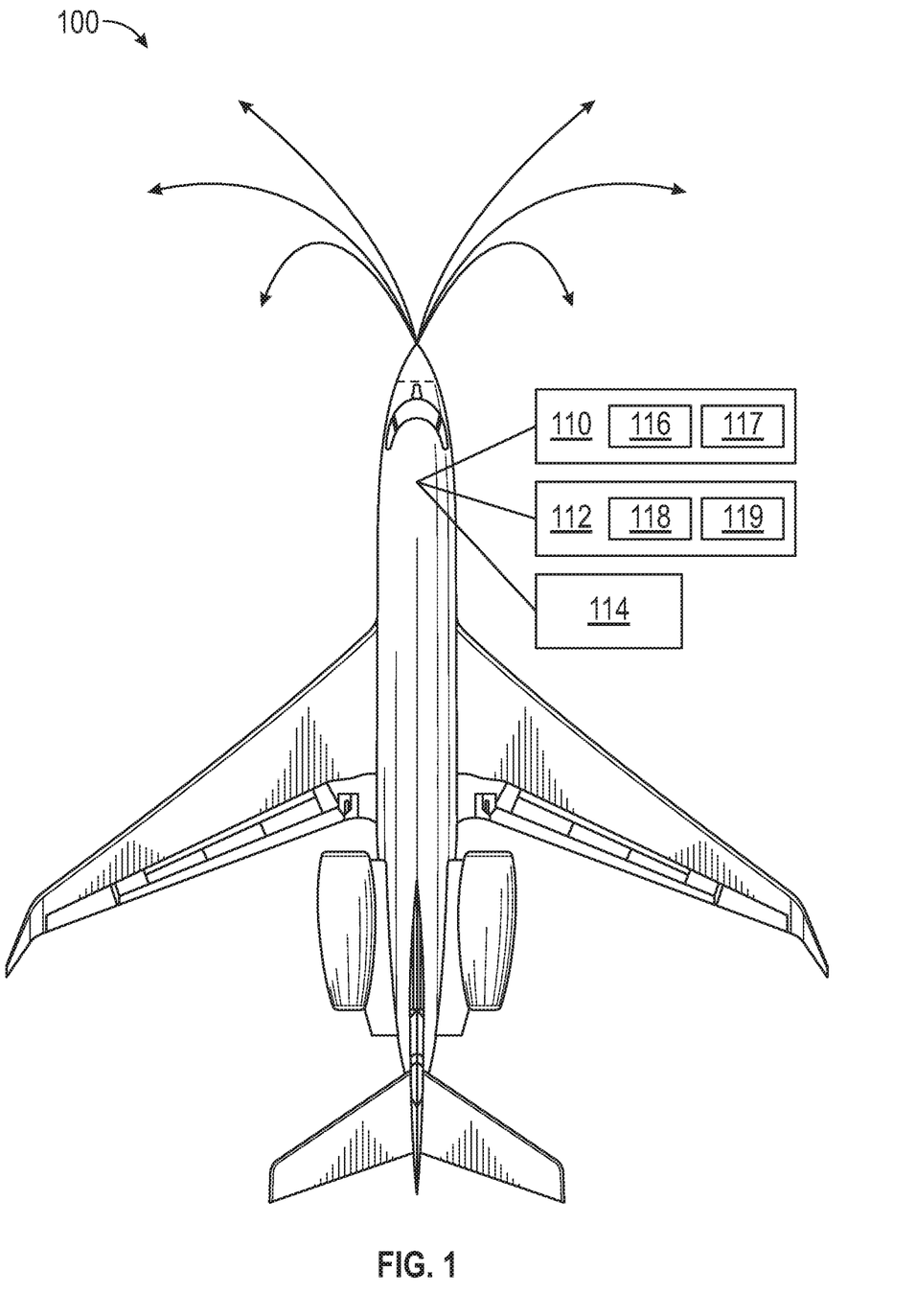
FIG. 1 is a schematic diagram illustrating an aircraft having a control system, in accordance with various embodiments.

Referring now to FIG. 1, an example of an aircraft 100 is illustrated in accordance with some embodiments. Aircraft 100 includes a control system 110, a sensor system 112, and an actuator system 114, among other systems. Although aircraft 100 is described in this description as an airplane, it should be appreciated that control system 110 may be utilized in other aircraft, land vehicles, water vehicles, space vehicles, or other machinery without departing from the scope of the present disclosure. For example, control system 110 may be utilized in submarines, helicopters, airships, spacecraft, or automobiles.

Control system 110 is an avionics system configured to operate aircraft 100 and to perform the methods described below. Control system 110 includes at least one processor 116 and a non-transitory computer readable storage device or medium 117. Non-transitory computer readable storage device or medium 117 is storage device for storing instructions for performing the method described below. At least one processor 116 is one or more data processors configured to execute the instructions to perform the method described below. The processor may be any custom made or commercially available processor, a central processing unit (CPU), a graphics processing unit (GPU), an auxiliary processor among several processors associated with control system 110, a semiconductor based microprocessor (in the form of a microchip or chip set), a macroprocessor, any combination thereof, or generally any device for executing instructions. The computer readable storage device or medium may include volatile and nonvolatile storage in read-only memory (ROM), random-access memory (RAM), and keep-alive memory (KAM), for example. The computer-readable storage device or medium may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by control system 110 in controlling aircraft 100.

The instructions may include one or more separate programs, each of which comprises an ordered listing of executable instructions for implementing logical functions. The instructions, when executed by the processor, receive and process signals from the sensor system, perform logic, calculations, methods and/or algorithms for automatically controlling the components of aircraft 100, and generate control signals for actuator system 114 to automatically control the components of aircraft 100 based on the logic, calculations, methods, and/or algorithms. Although only one control system 110 is shown in FIG. 1, embodiments of aircraft 100 may include any number of control systems 110 that communicate over any suitable communication medium or a combination of communication media and that cooperate to process the sensor signals, perform logic, calculations, methods, and/or algorithms, and generate control signals to automatically control features of aircraft 100. In various embodiments, one or more instructions of control system, when executed by the processor, performs the methods described below to compute airspeeds.

Sensor system 112 includes one or more sensing devices that sense observable conditions of the exterior environment, the interior environment of aircraft 100, or operational conditions and status of aircraft 100. For example, sensor system 112 may include accelerometers, gyroscopes, RADARs, LIDARs, global positioning systems, optical cameras, thermal cameras, ultrasonic sensors, and/or other sensors. In the example provided, sensor system 112 includes a pitot static system with a pitot tube 118 and a static port 119 for determining Indicated Airspeed, as will be appreciated by those with ordinary skill in the art.

Actuator system 114 includes one or more actuator devices that control one or more vehicle features. For example, actuator system 114 may include actuators that manipulate control surfaces on aircraft 100, extend or retract landing gear of aircraft 100, an/or move other components of aircraft 100.

Figure 2:
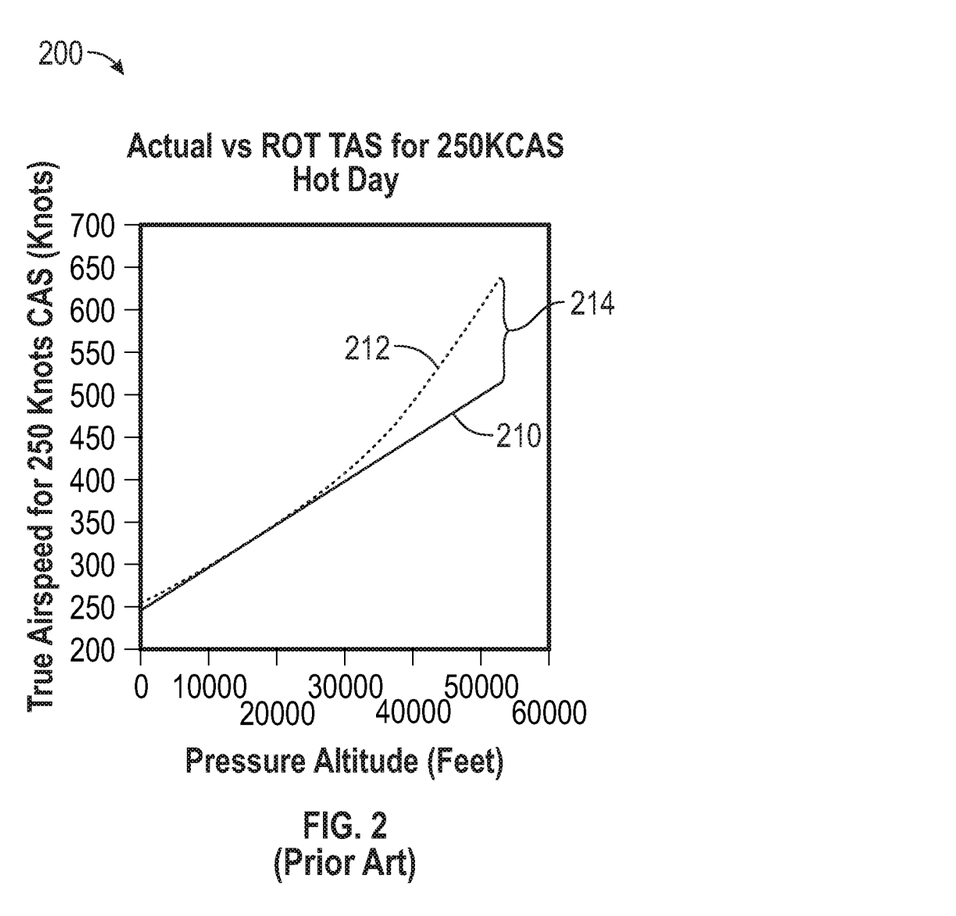
FIG. 2 is a graph of a prior art "rule of thumb" calculated True Airspeed and an actual True Airspeed corresponding to 250 knots Calibrated Airspeed as a function of pressure altitude is illustrated.

Referring now to FIG. 2, a graph 200 is illustrated of a prior art "rule of thumb" (ROT) calculated True Airspeed ($TAS_{ROT}$) 210 and an actual True Airspeed ($TAS_{Actual}$) 212 as a function of pressure altitude on a hot day that is 20 degree Celsius above a STD. The illustrated ROT method is a linear relationship between $TAS_{ROT}$ and CAS as described above and as can be seen by the straight-line shape of $TAS_{ROT}$. $TAS_{Actual}$ 212 indicates the actual True Airspeed of aircraft 100 as determined by eq. 1 below using a measured air density at the current position of aircraft 100. For example, control system 110 may measure the current air density using the pitot-static system of sensor system 112. A difference 214 between $TAS_{ROT}$ 210 and $TAS_{Actual}$ is large at high altitude. Therefore, conversions between CAS and TAS in prediction models may be inaccurate.

Figure 3:
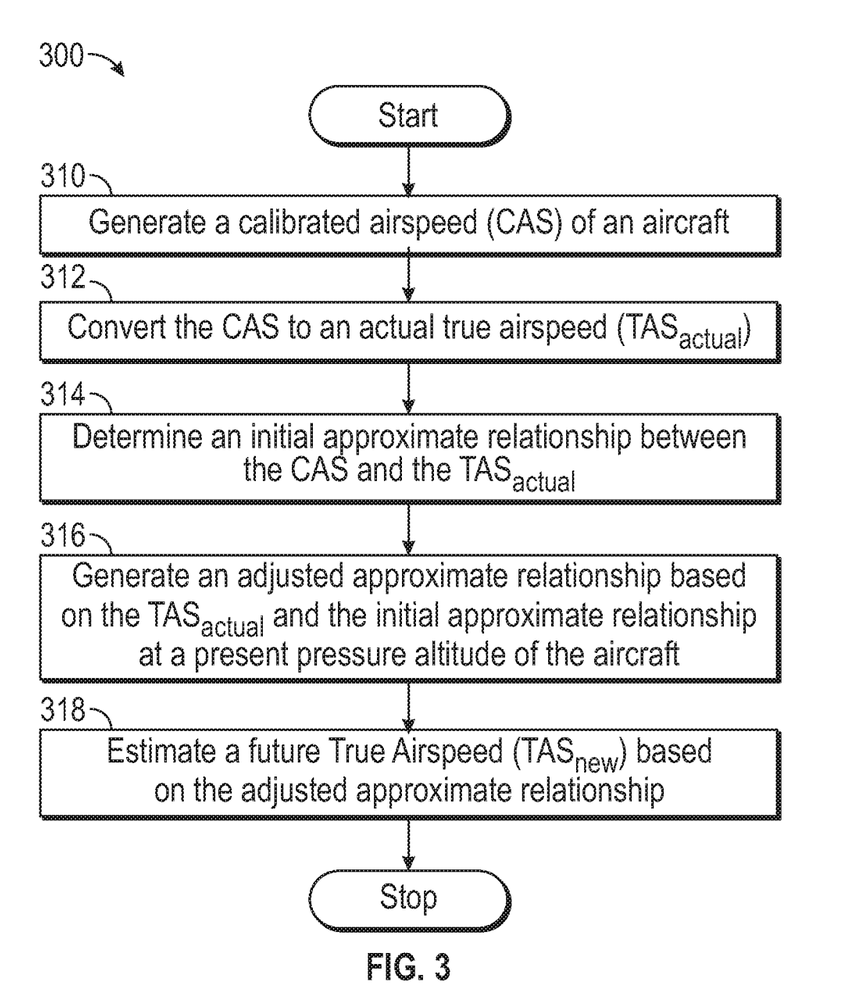
FIG. 3 is a flow chart illustrating a method for converting between Calibrated Airspeed and True Airspeed, in accordance with various embodiments.
Figure 4:
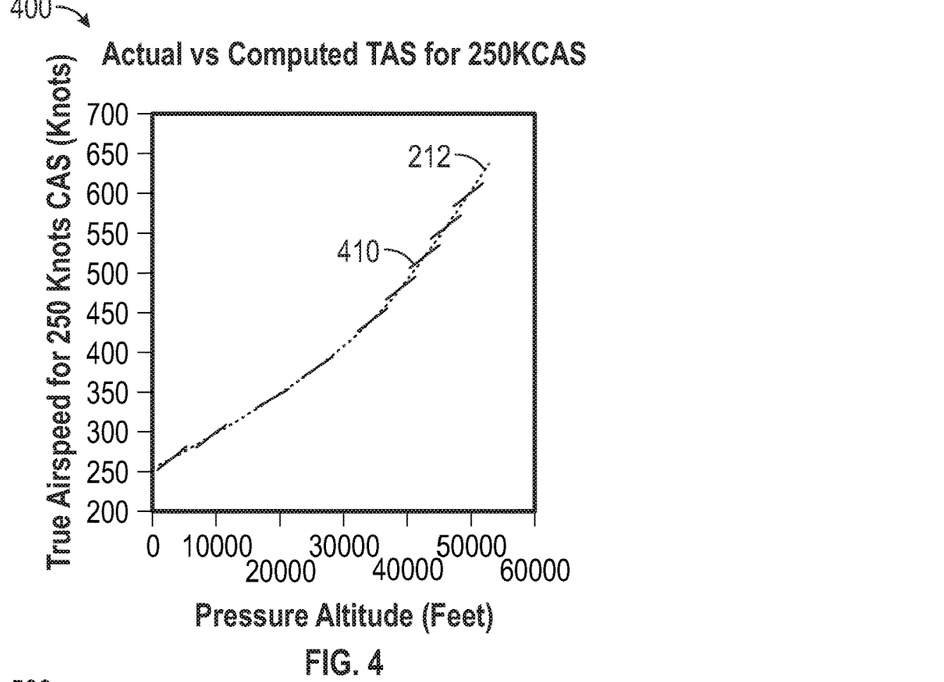
FIGS. 4-5 are graphs of airspeeds according to various embodiments.
Figure 5:
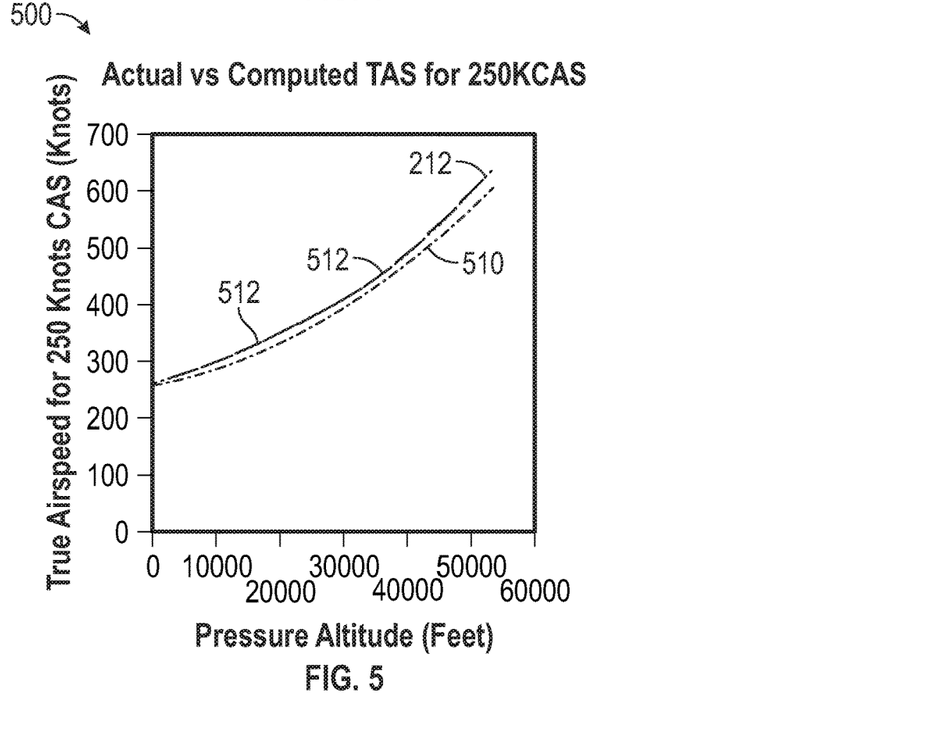

Referring now to FIGS. 3-5, and with continued reference to FIGS. 1-2, a method 300 for converting between airspeed types and graphs 400 and 500 of True Airspeed consistent with method 300 are illustrated in accordance with some embodiments. In the example provided, control system 110 performs the tasks of method 300. For example, instructions for converting between airspeed types may be stored on storage device 117 and one or more processors 116 may be configured to execute the instructions. Other systems may be utilized to perform method 300 without departing from the scope of the present disclosure. In the example provided, method 300 is utilized to convert between Calibrated Airspeed and True Airspeed at estimated future positions of aircraft 100 when evaluating potential trajectories of aircraft 100 in an aircraft hazard assessment system.

Task 310 generates a Calibrated Airspeed (CAS) of an aircraft. For example, control system 110 may generate the CAS based on sensor readings from pitot tube 118 and static port 119 adjusted for known instrument and position errors for the specific type and model of aircraft 100. In the examples illustrated in FIGS. 4-5, the CAS is 250 knots Calibrated Airspeed (KCAS). It should be appreciated that method 300 applies to any value of CAS, and that the illustrated lines and curves in the FIGS. may vary without departing from the scope of the present disclosure.

Task 312 converts the CAS to an actual True Airspeed ($TAS_{Actual}$) of the aircraft. For example, control system 110 may convert the CAS to $TAS_{Actual}$ using eq. 1 below with an actual measured air density at the current altitude of aircraft 100.

Task 314 determines an initial approximate relationship between the CAS and the $TAS_{Actual}$. The initial approximate relationship establishes a lapse rate or change in TAS with a given change in pressure altitude based on a standard day. In the example illustrated in FIG. 4, control system 110 determines the initial approximate relationship as the linear ROT described above. In the example illustrated in FIG. 5, control system 110 determines the initial approximate relationship as a second order curve fit approximation 510 of a full CAS to TAS equation:

$$CAS = \alpha_0 \sqrt{5\left[\left(\frac{\frac{1}{2}\rho TAS^2}{P_0}+1\right)^{\frac{2}{7}}-1\right]} \quad \text{(eq. 1)}$$

It should be appreciated that other orders and other methods for forming the fit curve or other relationship may be utilized without departing from the scope of the present disclosure. In the example provided, task 314 determines the initial approximate relationship based on a standard day. For example, the initial approximate relationship is not based on the actual conditions because the actual density ($\rho$) of air at each altitude varies in an unpredictable manner. To adjust for the actual conditions and difference from a standard day, method 300 proceeds to task 316.

Task 316 generates an adjusted approximate relationship based on the $TAS_{Actual}$ and the initial approximate relationship at a present pressure altitude of the aircraft. For example, control system 110 may generate the adjusted approximate relationship as an offset of the initial approximate relationship.

In the example illustrated in FIG. 4, the ROT line initial approximation is broken into adjusted approximate relationship segments 410. Each segment 410 is offset from the initial approximate relationship so that the center of the respective segment 410 is at $TAS_{Actual}$ 212. In the example illustrated, ten altitudes are chosen at 5000 feet increments and the ROT method is used to predict TAS at each chosen altitude. The example illustrated in FIG. 4 is for a standard day (STD) and has a maximum error of approximately 9 knots, which is significantly more accurate than the ROT method alone and only slightly less accurate that using eq. 1. Even on non-standard days, the maximum error between computed and actual TAS does not exceed 10 knots at altitudes within 2000 feet of the chosen start altitude.

The adjusted approximate relationship illustrated in FIG. 4 is nearly as computationally simple as the ROT method and is suitable for converting airspeeds at many position iterations along potential trajectories. The relationship illustrated in FIG. 4 is also substantially more accurate than the non-adjusted ROT method even on non-standard days. In one example, the adjusted approximate relationship in accordance with FIG. 4 may be implemented in "C" language code as a ratio according to:

KCASRatio=((Initial KTAS/Initial KCAS)−1))/Initial Altitude; (eq. 2)

In the example illustrated in FIG. 5, the second order curve fit approximation 510 is also broken into segments 512 at the chosen start altitudes and are each offset so that the center of the respective segment 512 is at $TAS_{Actual}$ 212. The second order curve example approximation results in errors of less than 3 knots over a 2000 feet altitude band for 20 degrees hot or cold and for non-standard lapse rates that yield 10 degrees hotter or colder at high altitude cruise. In one example, an offset $TAS_{Offset}$ from the initial second order curve fit approximation 510 ($TAS_{CurveFit}$) in accordance with FIG. 5 may be implemented in "C" language code according to:

$TAS_{Offset}=TAS_{CurveFit}-TAS_{Actual}$ (eq. 3)

Task 318 estimates a future True Airspeed $TAS_{New}$ based on the adjusted approximate relationship. For example, control system 110 may make onboard future estimates of $TAS_{New}$ by first performing task 316 to find an adjusted approximate relationship at the present altitude of aircraft 100. The estimate of $TAS_{New}$ at a predicted future altitude may then be determined based on the adjusted approximate relationship. Task 318 may be visualized by following the curve of the respective segment 410 or 512 from the present altitude to the predicted future altitude and finding the vertical position corresponding to $TAS_{New}$ on the vertical axis. Although the example provided illustrates estimation of a future True Airspeed, the adjusted approximate relationship may be used to estimate a future Calibrated Airspeed without departing from the scope of the present disclosure. For example, task 318 may estimate a future airspeed of the aircraft based on the adjusted approximate relationship and a future altitude, wherein a "future airspeed" includes both a future True Airspeed and a future Calibrated Airspeed.

In one example, task 318 according to the linear initial approximation of FIG. 4 may be implemented in "C" language code according to:

KCAS=KTAS/(1+KCASRatio*New Altitude); (eq. 4)

In eq. 4, KCAS is Knots Calibrated Airspeed, KTAS is Knots True Airspeed, and New Altitude is the altitude at which the airspeeds are to be converted.

In one example, task 318 according to the second order approximation of FIG. 5 may be implemented in "C" language code according to:

$TAS_{New}=TAS_{FitNewAltitude}+TAS_{Offset}$ (eq. 5)

In eq. 5, $TAS_{New}$ is the airspeed to be estimated at the new altitude, $TAS_{FitNewAltitude}$ is the TAS indicated by the initial approximate relationship, and $TAS_{Offset}$ is the offset generated in task 316.

The various embodiments described herein provide a solution to a technical problem. Specifically, the computational capacity available onboard aircraft is limited due to weight, power, and cost considerations. The embodiments described herein may permit many iterations of airspeed type conversion along many positions of a potential aircraft trajectory. By facilitating many iterations, the number of trajectories and/or the iteration capacity may be increased over systems and methods that utilize a full conversion equation. By providing adjustments to approximate relationships, the embodiments described herein may provide increased accuracy of converted airspeeds.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An avionics system for an aircraft, the avionics system comprising:
a storage device for storing instructions for converting between airspeed types; and
one or more data processors configured to execute the instructions to:
generate a calibrated airspeed of the aircraft;
convert the calibrated airspeed to an actual true airspeed of the aircraft;
determine an initial approximate relationship between the calibrated airspeed and a computed true airspeed as a function of a pressure altitude of the aircraft;
generate an adjusted approximate relationship based on the actual true airspeed and the initial approximate relationship at a chosen pressure altitude; and
estimate a future airspeed of the aircraft based on the adjusted approximate relationship and a future altitude.

2. The avionics system of claim 1, wherein the one or more data processors is further configured to execute the instructions to generate the adjusted approximate relationship as an offset of the actual true airspeed from the initial approximate relationship based on a measured air density.

3. The avionics system of claim 2, wherein the one or more data processors is further configured to execute the instructions to generate the offset ($TAS_{Offset}$) according to:
$TAS_{Offset}=TAS_{Fit}-TAS_{Actual}$, where TAS is True Airspeed and $TAS_{Fit}$ is a true airspeed according to the initial approximate relationship at the chosen pressure altitude.

4. The avionics system of claim 3, wherein the one or more data processors is further configured to execute the instructions to estimate the future airspeed as a future True Airspeed ($TAS_{New}$) from an approximate true airspeed $TAS_{FitNewAltitude}$ according to the initial approximate relationship at the future altitude according to:

$$TAS_{New}=TAS_{FitNewAltitude}+TAS_{Offset}$$

5. The avionics system of claim 1, wherein the one or more data processors is further configured to execute the instructions to retrieve a fit curve of a CAS to TAS equation as the initial approximate relationship.

6. The avionics system of claim 5, wherein the one or more data processors is further configured to execute the instructions to retrieve a second order approximation as the fit curve.

7. A method for converting between airspeed types of an aircraft, the method comprising:
generating, by one or more data processors, a calibrated airspeed of the aircraft;
converting, by one or more data processors, the calibrated airspeed to an actual true airspeed of the aircraft;
determining, by one or more data processors, an initial approximate relationship between the calibrated airspeed and a computed true airspeed as a function of a pressure altitude of the aircraft;
generating, by one or more data processors, an adjusted approximate relationship based on the actual true airspeed and the initial approximate relationship at a chosen pressure altitude; and
estimating, by one or more data processors, a future airspeed of the aircraft based on the adjusted approximate relationship and a future altitude.

8. The method of claim 7, further comprising generating the adjusted approximate relationship as an offset of the actual true airspeed from the initial approximate relationship.

9. The method of claim 8, further comprising generating the offset ($TAS_{Offset}$) according to:
$TAS_{Offset}=TAS_{Fit}-TAS_{Actual}$, where TAS is True Airspeed and $TAS_{Fit}$ is a true airspeed according to the initial approximate relationship at the chosen pressure altitude.

10. The method of claim 9, further comprising estimating the future airspeed as a future True Airspeed ($TAS_{New}$) from an approximate true airspeed $TAS_{FitNewAltitude}$ according to the initial approximate relationship at the future altitude according to:

$$TAS_{New}=TAS_{FitNewAltitude}+TAS_{Offset}$$

11. The method of claim 7, further comprising retrieving a fit curve of a CAS to TAS equation as the initial approximate relationship.

12. The method of claim 11, further comprising retrieving a second order approximation as the fit curve.

13. A non-transitory computer readable storage medium having instructions that when executed cause one or more data processors to:
generate a calibrated airspeed of the aircraft;
convert the calibrated airspeed to an actual true airspeed of the aircraft;
determine an initial approximate relationship between the calibrated airspeed and a computed true airspeed as a function of a pressure altitude of the aircraft;
generate an adjusted approximate relationship based on the actual true airspeed and the initial approximate relationship at a chosen pressure altitude; and
estimate a future airspeed of the aircraft based on the adjusted approximate relationship and a future altitude.

14. The storage medium of claim 13, further comprising instructions that when executed cause one or more data processors to generate the adjusted approximate relationship as an offset of the actual true airspeed from the initial approximate relationship.

15. The storage medium of claim 14, further comprising instructions that when executed cause one or more data processors to generate the offset ($TAS_{Offset}$) according to:
$TAS_{Offset}=TAS_{Fit}-TAS_{Actual}$, where TAS is True Airspeed and $TAS_{Fit}$ is a true airspeed according to the initial approximate relationship at the chosen pressure altitude.

16. The storage medium of claim 15, further comprising instructions that when executed cause one or more data processors to estimate the future airspeed as a future True Airspeed ($TAS_{New}$) from an approximate true airspeed $TAS_{FitNewAltitude}$ according to the initial approximate relationship at the future altitude according to:

$$TAS_{New}=TAS_{FitNewAltitude}+TAS_{Offset}$$

17. The storage medium of claim 14, further comprising instructions that when executed cause one or more data processors to retrieve a fit curve of a CAS to TAS equation as the initial approximate relationship.

18. The storage medium of claim 17, further comprising instructions that when executed cause one or more data processors to retrieve a second order approximation as the fit curve.

19. An aircraft comprising:
a pitot tube;
a static port;

an avionics system comprising a storage device for storing instructions for converting between airspeed types and one or more data processors configured to execute the instructions to:

receive sensor signals from the pitot tube and the static port;

generate a calibrated airspeed of the aircraft based on the sensor signals;

convert the calibrated airspeed to an actual true airspeed of the aircraft;

determine an initial approximate relationship between the calibrated airspeed and a computed true airspeed as a function of a pressure altitude of the aircraft;

generate an adjusted approximate relationship based on the actual true airspeed and the initial approximate relationship at a chosen pressure altitude; and estimate a future airspeed of the aircraft based on the adjusted approximate relationship and a future altitude.

20. An avionics system for an aircraft, the avionics system comprising:

means for generating a calibrated airspeed of the aircraft;

means for converting the calibrated airspeed to an actual true airspeed of the aircraft;

means for determining an initial approximate relationship between the calibrated airspeed and a computed true airspeed as a function of a pressure altitude of the aircraft;

means for generating an adjusted approximate relationship based on the actual true airspeed and the initial approximate relationship at a chosen pressure altitude; and means for estimating a future airspeed of the aircraft based on the adjusted approximate relationship and a future altitude.

21. A memory for storing data for access by an avionics system of an aircraft, the memory comprising;

an initial approximate relationship data structure that stores first data for determining an initial approximate relationship between a calibrated airspeed a computed true airspeed as a function of a pressure altitude of the aircraft;

an adjusted approximate relationship data structure that stores second data for determining an adjustment to the initial approximate relationship based on an actual true airspeed at a chosen pressure altitude; and a future airspeed data structure that stores third data for estimating a future airspeed of the aircraft based on the adjustment and a future altitude.

* * * * *